United States Patent Office 2,925,803
Patented Feb. 23, 1960

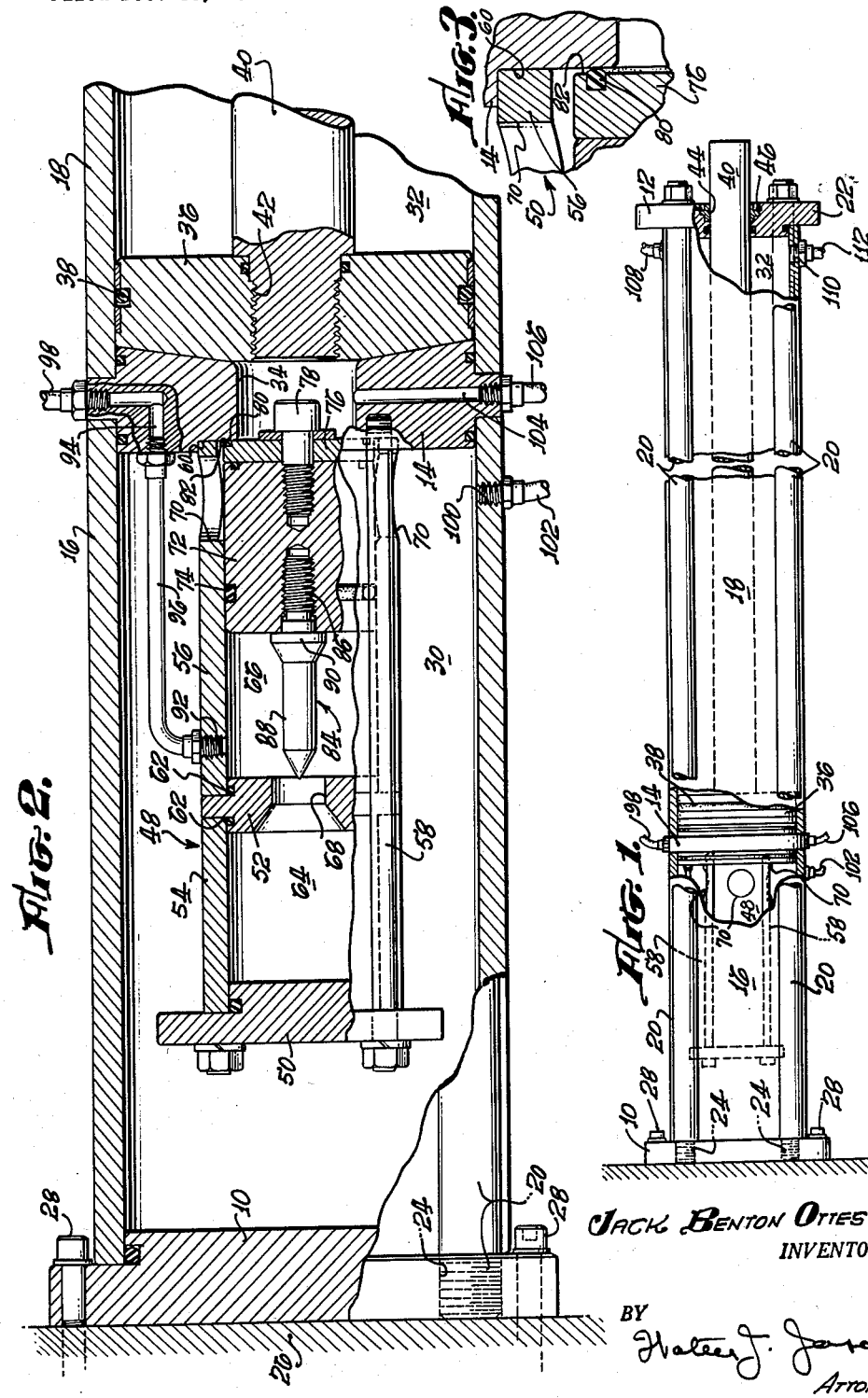

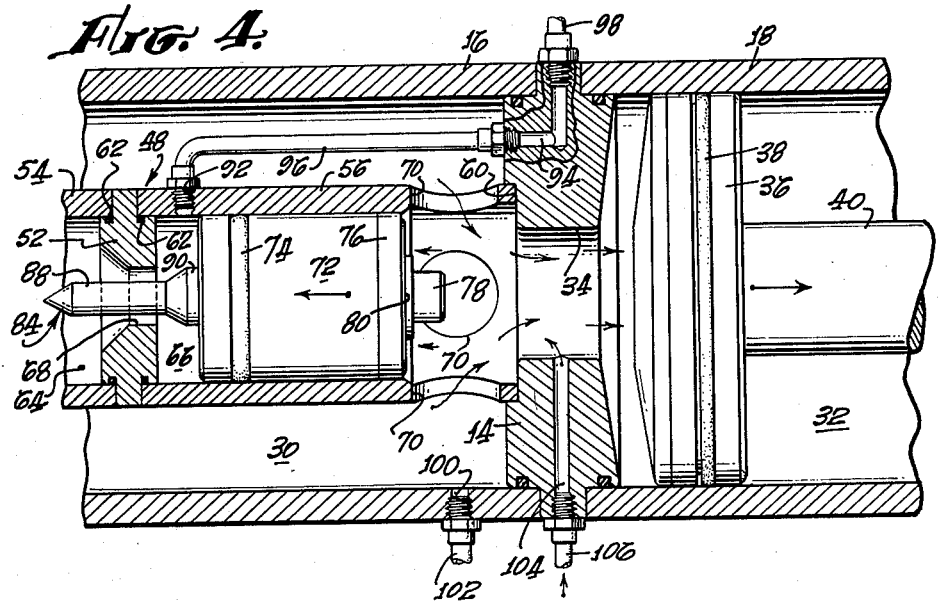
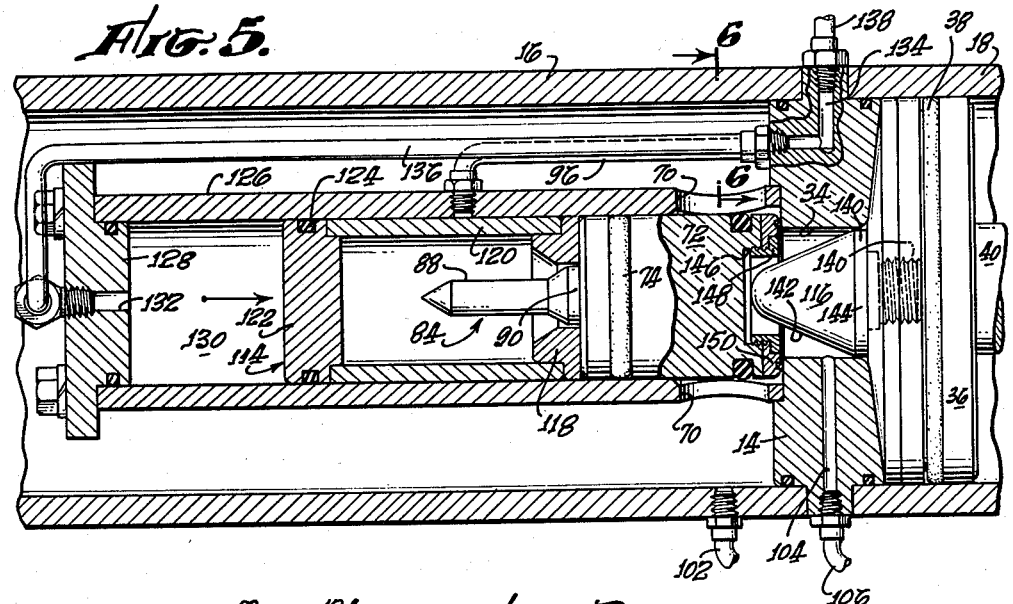
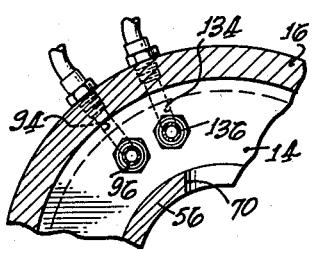

2,925,803

ACTUATING PRESSURE RELEASE SYSTEM

Jack B. Ottestad, Claremont, Calif., assignor to General Dynamics Corporation, San Diego, Calif., a corporation of Delaware Application December 16, 1958, Serial No. 780,774

19 Claims. (Cl. 121—38)

This invention relates generally to actuators, more particularly, it relates to an actuator utilizing a novel pressure release system for rapid release of actuating pressure upon an actuating piston.

The present invention is adapted for very rapid production of output thrust or acceleration and is related generally to the actuators described and claimed in the copending application of Jack Benton Ottestad, Serial No. 617,014, filed October 19, 1956, the copending application of Jack Benton Ottestad and Samuel Arthur Skeen, Serial No. 683,855, filed September 13, 1957, and the copending application of Jack Benton Ottestad and Samuel Arthur Skeen, Serial No. 690,744, filed October 17, 1957. In each of the actuators of these applications, a setting pressure urges an actuating piston toward an orifice wall and causes a sealing element to effect a positive pressure seal about the orifice between the wall and the piston. An actuating pressure is applied through the orifice upon the portion of the piston within the seal. In certain embodiments of these actuators, the actuating pressure is increased to overbalance the force of the setting pressure and move the piston from the orifice wall. This eliminates the pressure seal and releases the actuating pressure upon an area of the piston outside the sealing element. High output thrust is thereby produced on the piston. In certain other embodiments, means are provided for applying externally controlled triggering force to the actuator piston. This force cooperates with the force of the actuating pressure on the piston area within the seal to eliminate the pressure seal and release the actuating pressure upon the piston area outside the seal.

The actuators of the copending applications are characterized by certain limitations and shortcomings. Among these are that the pressure or force opposes acceleration of the actuator piston and detracts from useful actuator output. An important limitation is that, in order to increase the output force on the actuator piston, the orifice must be reduced in size to decrease the piston area within the pressure seal relative to the total area acted upon by the actuating pressure after the seal is eliminated. The smaller orifice produces increased orifice losses which detract from useful actuator output. Therefore, a compromise must be made between the conflicting considerations of minimizing the orifice losses and minimizing the piston area within the seal.

In overcoming the foregoing limitations and in achieving its objects and advantages, the present invention utilizes a novel actuating pressure release system wherein a separate release piston confronts one side of an orifice wall and an actuator piston is positioned on the opposite side of the orifice wall. The release piston and the wall are adapted to cooperate to provide a circular pressure seal around the orifice. The release piston is urged by a set force or set pressure into engagement with the orifice wall to establish this pressure seal.

An actuating pressure is applied to an area of the release piston outside the circular seal to oppose the set force. The release piston is then accelerated from the orifice wall to release the actuating pressure through the orifice upon the actuator piston, either by increasing the actuating pressure to overbalance the set force and eliminate the pressure seal to expose the release piston area within the seal to the actuating pressure, or by utilizing a separate triggering force to overbalance the set force and release the actuating pressure upon the release piston area within the seal. The triggering force may be provided by a triggering pressure applied to the release piston area within the seal to cooperate with the actuating pressure in overbalancing the set force.

The novel arrangement of the present invention provides valuable results. An important advantage is that movement of the actuator piston is not opposed by the set force. Increased useful output force, acceleration and velocity are therefore provided. Because the actuating pressure is rapidly released against the entire cross-sectional area of the actuator piston, increased actuator output is provided. Important results are derived from the novel arrangement wherein the set force is balanced by the action of the actuating pressure upon the release piston area outside the pressure seal and wherein the piston area within the seal is exposed to the actuating pressure upon elimination of the pressure seal. The force which is thus rapidly applied to accelerate the release piston from the orifice plate is increased by increasing the orifice size to increase the proportion of piston area which is acted upon by the actuating pressure after the seal is eliminated. The acceleration of the release piston and the rate of release of pressure through the orifice are increased. Increasing the orifice size reduces the orifice losses and thereby increases the useful actuator output. Improved actuator output therefore results from the combined effects of reduced orifice losses and more rapid release of pressure through the orifice upon the actuator piston.

It is therefore an object of the present invention to alleviate the foregoing and other limitations by providing an actuator having novel means for releasing actuating pressure upon an actuator piston.

It is an object of this invention to provide a novel system for very rapidly releasing pressure.

An object of the present invention is the provision of an actuator which provides improved output through the utilization of a novel pressure release system for rapid application of actuating pressure.

It is an object of the present invention to provide an actuator, the output of which is substantially unrestricted by internal pressures, forces, or orifice losses.

An object of this invention is the provision of an actuator wherein actuator piston movement is substantially unopposed by internal pressures or forces.

It is an object of the present invention to provide an improved actuator wherein actuating pressure is very rapidly released through an orifice upon an actuator piston with low orifice losses.

An object of the present invention is the provision of a novel actuator wherein improved output results from very rapid release of actuating pressure through a relatively large orifice upon a large actuator piston area.

It is another object of this invention to provide a novel actuator wherein very rapid acceleration of the release piston from an orifice effects very rapid release of pressure against an actuator piston.

Another object of the present invention is the provision of an actuator wherein a relatively high proportion of a release piston area is rapidly exposed to an actuating pressure to rapidly release the pressure upon an actuator piston.

Other objects and features of the present invention, as well as many advantages thereof, will become apparent to those skilled in the art from a consideration of the following description, the appended claims, and the accompanying drawings, in which:

Figure 1 is an elevational view, partially in section, showing a preferred embodiment of the actuator of the present invention;

Figure 2 is an elevational sectional view showing details of the actuator of Figure 1 on an enlarged scale;

Figure 3 is a fragmentary sectional view showing certain details of the actuator of Figure 2 on an enlarged scale;

Figure 4 is a fragmentary sectional view showing the actuator of Figure 2 during operation;

Figure 5 is a fragmentary sectional view of a modified form of the actuator of the present invention; and Figure 6 is a fragmentary sectional view taken at line 6—6 of Figure 5.

Referring to the drawings, and particularly to Figures 1 and 2, there is shown a preferred embodiment of the actuator of the present invention. The actuator assembly includes a base member 10, an end member 12, an orifice plate or wall 14, and cylindrical sections 16 and 18, which are secured in clamped relation by tie-bolts 20. The tie-bolts extend through appropriately arranged openings in a flange portion 22 of the end member and engage threaded openings 24 in the base membr 10. The actuator assembly is secured to a wall or foundation 26 by bolts 28 which extend through openings in a flange portion of the circular base member 10. Pressure sealing for the actuator housing is provided by resilient seal rings in appropriate grooves in the orifice plate or wall 14, in the base member and in the end member. The cylindrical actuator housing may be considered as divided into pressure chambers 30 and 32 by the orifice wall. An orifice 34 in the orifice plate interconnects these chambers for a purpose which is hereinafter explained.

An actuator piston 36 is positioned in chamber 32 and is adapted to seat against the orifice plate, as shown in Figure 2. An annular sealing element 38 in a peripheral groove in the piston provides pressure sealing between the actuator piston and cylindrical section 18. Bearing rings are disposed in recesses on either side of the sealing element to reduce sliding friction and to maintain alignment between the piston and the cylindrical section. A reduced end portion of a thrust column 40 is secured in a threaded axial opening 42 in the actuator piston. As shown in Figure 1, the thrust column extends through an axial opening in end member 12 and is slidably received in a bearing 44 which is disposed within an enlarged portion of the opening and retained by a locking ring 46. A resilient annular sealing element in a groove within the opening provides pressure sealing.

A release system assembly 48 is secured to the orifice plate, as shown in Figures 1 and 2. A cap member 50, an apertured wall member 52, and cylindrical sections 54, 56 are secured in clamped relation with the orifice plate 14 by tie-bolts 58. The end portion of cylindrical section 56 abuts a circular recessed surface 60 which extends about the orifice 34. Resilient seal rings 62 in appropriate grooves in the apertured wall member and in the cap member provide pressure sealing between these members and the cylindrical sections. The cylindrical sections and the cap member 50 form a casing which is divided into pressure chambers 64 and 66 by wall member 52. An aperture 68 is provided in the wall member 52 between the chambers, and circular ports 70 are provided in cylindrical section 56 near the orifice plate, for purposes hereinafter discussed.

A release piston 72 is slidably positioned in chamber 66 and confronts the orifice plate. An annular sealing element 74 in an appropriate peripheral groove in the piston provides pressure sealing between the piston and cylindrical section 56. A circular seal base 76 is secured by a bolt 78 to the piston and is provided with a groove in which a circular resilient pressure sealing element 80 is secured as by bonding. Pressure sealing between the valve piston and the seal base is provided by an appropriate seal ring. As shown, circular seal 80 encircles orifice 34 and effects a pressure seal between the piston and the orifice plate when the valve piston is seated against the orifice plate. As indicated in Figure 3, an annular area 82 of the piston or seal base is disposed outside this circular pressure sealing which is thus effected. A deceleration metering pin 84 extends from the side of the piston opposite from the seal base, and is secured by engagement of its threaded shank portion 86 in an axial opening in the piston. The metering member has an elongated section 88 and an enlarged section 90 adapted to cooperate with aperture 68.

A port 92 in the release system casing, a passage 94 in the orifice plate and fluid couplings 96, 98 interconnect a source of set pressure (not shown) with chamber 66 in the release system assembly. Chamber 30 of the actuator communicates with a source of actuating pressure (not shown) through a port 100 and a fluid coupling 102. Tube 106 and radial passage 104 in the orifice plate interconnect orifice 34 and another source of pressure (not shown). A fluid coupling 108 (Figure 1) provides means for introducing pressure from another source (not shown) into chamber 32 of the actuator. A similar coupling 110 and a port 112 communicate with chamber 32 for a purpose which is hereinafter explained.

In operation, the actuator of the present invention is capable of imparting very high level thrust or acceleration to the output thrust column 40. A set pressure is first introduced into chambers 66 and 64 through opening 92, fluid coupling 96 and passage 94. The set pressure acts upon the cross-sectional area of release piston 72 and urges the piston against orifice plate 14. This compresses circular resilient seal 80 against the recessed surface 60 of the orifice plate to effect a positive pressure seal about the orifice 34. A high actuating pressure is established in chamber 30 through port 100 and coupling 102. This pressure is exerted through ports 70 and is sufficient in acting upon the relatively small annular area of seal base 76 outside resilient seal 80 to substantially balance the force of the set pressure acting oppositely on the piston. The piston is thus held in a state of equilibrium.

The forces on the release piston are next unbalanced to cause movement of the piston from the orifice plate and eliminate the pressure seal provided by sealing element 80. This may be accomplished in either of two ways. By one method, the actuating pressure in chamber 30 is increased by a differential sufficient to unbalance the forces and cause movement of the piston from the orifice plate. By the other method, a triggering pressure is introduced through coupling 106 and passage 104 upon the release piston area within circular sealing element 80. This pressure, cooperating with the actuating pressure acting on the piston area outside the sealing element 80 unbalances the forces on the piston and disengages the sealing element 80.

Upon elimination of the pressure seal, the high actuating pressure is released substantially instantaneously upon the piston area within sealing element 80. The release piston is thereby impelled with extremely high acceleration from the orifice plate or wall 14, as indicated in Figure 4. This releases the high actuating pressure substantially instantaneously through the orifice to act upon the actuator piston 36. The actuating pressure is thus suddenly applied to the entire area of the actuator piston confronting the orifice plate, as defined by peripheral sealing element 38, on which no substantial pressure had been acting. A great force is thus applied to the actuator piston to impel it from the orifice wall to produce high level actuator output.

The acceleration of the release piston from the orifice wall, and the rapidity of the release of actuating pressure through the orifice, are functions of the proportion of the release piston area within sealing element 80 relative to the area outside the seal. The greater the area within, the greater is the accelerating force when the sealing element 80 is disengaged.

From the geometric relations of the parts, it will be appreciated that an increase of the piston area within the seal may be effected concurrently with increase in orifice size. Therefore, an important advantage of the present invention is that increased speed in releasing actuating pressure upon the actuator piston is accompanied by decreased orifice losses and by consequent increased force on the actuator piston, thus compounding the advantages provided by the present invention.

From the foregoing description, it will be understood that the actuator of the present invention provides improved output through the utilization of a novel pressure release system for rapidly releasing actuating pressure upon an actuator piston. It will be observed that movement of the actuator piston need not be opposed by any substantial pressure in chamber 32 or by other forces within the actuator. It will therefore be understood that actuator output is not restricted by internal actuator pressures or forces. As hereinbefore mentioned, the actuator output is enhanced by the rapid application of the actuating pressure to the entire cross-sectional area of the actuator piston. The actuators of the copending applications release actuating pressure upon an increased actuator piston area after the actuating pressure has already been applied to a portion of the piston area.

After the release piston have been accelerated from the orifice wall, deceleration metering pin 84 coacts with the aperture 68 of wall member 52 to effect predetermined deceleration of the release piston in the manner described in the copending applications. The release piston forces the gas in chamber 66 through the deceleration aperture. The net aperture flow area is varied according to piston position by the longitudinal contour of the deceleration pin to produce predetermined variation in back pressure, in a manner known in the art. It will be understood that by using an appropriately contoured pin, a desired deceleration-time pattern may be obtained.

In order to prepare the actuator for repeat operation, the pistons must be reseated against the orifice plate. The actuator piston is reseated against the orifice plate by a relatively low pressure introduced into chamber 32. The release piston must be reseated against the orifice plate to re-establish pressure sealing by means of resilient seal 80. In the embodiment described hereinbefore, reseating is preferably effected by reducing the pressure in chamber 30 and within the orifice to a value below the set pressure in chambers 64 and 66, so that the set pressure urges the release piston against the orifice plate.

Upon reseating of the pistons, the trapping of pressure in the space defined between circular sealing element 80 on the release piston and seal 38 on the actuator piston is prevented by relieving pressure through passage 104 in the orifice plate. If not released, trapped pressure would act upon the actuator piston area within seal 80 and would oppose the force exerted oppositely on the release piston by the setting pressure. Upon increasing the pressure in chamber 30, the release piston would be moved and seal 80 would be disengaged by the action of a relatively low pressure in chamber 30 upon the piston area outside circular seal 80, instead of by the desired actuating pressure.

A modified form of the actuator of the present invention is shown in Figure 5. This embodiment differs from the embodiment hereinbefore described in that a reseating assembly 114 is provided in the release system assembly for moving the release piston against the orifice plate preparatory to repeat operation. It also differs in that a metering pin 116 is provided on the actuator piston for governing the thrust-time or acceleration-time pattern of the actuator output. A movable apertured wall member 118 is utilized instead of the fixed wall member 52 of Figure 1. A cylindrical spacer 120 is secured as by welding between the wall member and a circular plate 122 to form the reseating assembly 114, which normally abuts cap member 128. A seal ring 124 in an appropriate peripheral groove in plate 122 provides pressure sealing between the reseating assembly and cylindrical release system casing 126. It will be observed that cylindrical casing 126, cap member 128 and plate 122 cooperate to define an expansible pressure chamber 130 when plate 122 is spaced from the cap member. An axial opening 132 in the cap member, a passage 134 angularly spaced from passage 94 (Figure 6), and fluid couplings 136, 138 interconnect chamber 130 with a source of reseating pressure (not shown). This pressure source is also connected with chamber 32 of the actuator by fluid coupling 108 (Figure 1).

The contoured metering member 116 is secured to the actuator piston by means of its reduced threaded end portion 140. The member 116 has a contoured portion 142 and an enlarged portion 144 closely fitting the orifice 34. To accommodate the metering member, an axial opening 146 is provided in the release piston. A retainer 148 is threaded into this opening and secures an annular seal base 150 to the piston, as shown.

The operation of the embodiment shown in Figures 5 and 6 is like that of the embodiment hereinbefore discussed, except for the functions of the metering member 116 and of the reseating assembly 114. The metering member 116 is contoured to control the output thrust-time or acceleration-time pattern on the thrust column 40, in the manner described in the copending applications hereinbefore identified. After circular sealing element 80 has been disengaged from the orifice wall and the actuator piston is in motion, the actuating pressure is released upon the actuator piston through a net orifice area governed by the metering member. A pressure drop is produced across the orifice which varies in accordance with this net effective orifice area. The net pressure on the actuator piston and the acceleration force thereon therefore vary in accordance with the net flow area. It will be understood that a selected acceleration-time or thrust-time pattern may be produced by an appropriately contoured metering pin. The manner of determining the contouring of metering members to produce selected output patterns is set forth in the copending applications hereinbefore identified.

The reseating of the actuator and release pistons is effected in a different manner than in the case of the embodiment of Figures 1, 2 and 4. A reseating pressure higher than the actuating pressure is utilized. The actuator piston is reseated by the introduction of the reseating pressure from a source (not shown) into chamber 32 of the actuator through coupling 112. The reseating pressure is also introduced into expansible chamber 130 through passage 134 in the orifice plate, coupling 136 and opening 132 in cap member 128. This pressure moves the reseating assembly 114 from the cap member 128. As shown in Figure 5, the reseating assembly is moved by the actuating pressure into contact with the release piston 72, and urges the release piston into seating relationship with the orifice plate 14 to re-establish the pressure seal about the orifice. After the pistons are reseated against the orifice plate, the pressure within the orifice 34 is relieved through passage 104 and coupling 106. The reseating pressure in chambers 30 and 32 is next relieved, leaving a relatively low pressure in chamber 32, and permitting the constant set pressure in the release system assembly to reseat the reseating assembly 114 against cap member 128.

It will be understood that utilization of the special reseating assembly obviates the necessity for exhausting the actuating pressure after each operation of the actuator. Economy of gas or fluid and savings of time are effected. The reseating pressure is preferably applied hydraulically, because of the greater convenience of generation and more rapid application of pressure. When hydraulic pressure is utilized, the fluid is removed from chamber 32 through opening 110 and coupling 112 in the actuator housing (Figure 1) after the actuator piston is seated.

Although specific embodiments of the present invention have been described and illustrated in detail, it is to be clearly understood that the same are by way of illustration and example only; it is to be understood that the invention is not limited thereto, as many variations will be readily apparent to those versed in the art and the invention is to be given its broadest possible interpretation within the terms of the appended claims.

The inventor claims:

1. An actuator comprising housing means, a wall defining an orifice within the housing means, a release piston positioned in the housing means, said release piston and said wall being adapted for cooperation to provide a pressure seal therebetween about said orifice, means for exerting a set force urging the release piston toward the wall to effect said pressure seal, and means for applying pressure to the release piston to overbalance the set force to eliminate said pressure seal and expose an increased area of the release piston to said pressure, whereby the release piston is rapidly moved from said wall to release the pressure through the orifice.

2. An actuator comprising housing means, a wall defining an orifice within the housing means, an actuator piston positioned on a first side of the wall, a release piston positioned on a second side of the wall, the release piston and the wall being adapted for cooperation to provide a pressure seal therebetween about said orifice, means for exerting a set force urging the release piston toward the wall to effect said pressure seal, and means for applying pressure to the release piston to overbalance the set force to eliminate said pressure seal and expose an increased area of the release piston to said pressure, whereby the release piston is rapidly moved from said wall to release the pressure through the orifice upon said actuator piston.

3. An actuator comprising housing means, a wall defining an orifice within the housing means, an actuator piston positioned on a first side of the wall, a release system assembly positioned on a second side of the wall, a release piston slidable in the release system assembly and adapted for cooperation with said wall to provide a pressure seal therebetween about said orifice, means for establishing a set pressure in said release assembly for exerting a set force to urge the release piston toward the wall to effect said pressure seal, and means for establishing an actuating pressure to act upon the release piston to overbalance the set force to eliminate said pressure seal and expose an increased area of the release piston to the actuating pressure, whereby the release piston is rapidly moved from the wall to release the actuating pressure upon said actuator piston.

4. An actuator comprising housing means, a wall defining an orifice within the housing means, an actuator piston positioned on a first side of said wall, a release piston positioned on a second side of the wall and adapted for cooperation therewith to provide a pressure seal therebetween about said orifice, means for exerting a set force urging the release piston toward the wall to effect said pressure seal, means for applying an actuating pressure to the release piston to oppose said set force, and means for applying a triggering force to the release piston to cooperate with said actuating pressure in overbalancing the set force to eliminate the pressure seal and expose an increased area of the release piston to the actuating pressure, whereby the release piston is rapidly moved from the wall to release the actuating pressure through the orifice upon said actuator piston.

5. An actuator comprising housing means, a wall defining an orifice within the housing means, a release system assembly disposed on a first side of the wall, a release piston positioned in the release system assembly, a resilient sealing element positioned between the release piston and the wall for effecting a pressure seal therebetween about said orifice, means for exerting a set force urging said release piston toward the wall to effect said pressure seal, and means for establishing an actuating pressure to act upon a portion of the release piston outside said pressure seal to overbalance said set force to eliminate pressure seal and release the actuating pressure upon an increased area of the release piston, whereby the release piston is accelerated from the wall to release the actuating pressure through the orifice.

6. An actuator comprising housing means, a wall defining an orifice between first and second chambers within the housing means, an actuator piston positioned in said first chamber, a release system assembly disposed in said second chamber, a release piston positioned in the release system assembly and adapted for cooperation with said wall to provide a pressure seal therebetween about said orifice, means for exerting a set force urging said release piston toward the wall to effect said pressure seal, and means for establishing an actuating pressure in said second chamber to act upon a portion of the release piston outside said pressure seal to overbalance said set force to eliminate said pressure seal and release the actuating pressure upon an increased area of the release piston, whereby the release piston is accelerated from the wall to release the actuating pressure through the orifice upon said actuator piston.

7. An actuator comprising housing means, a wall defining an orifice between first and second chambers within the housing means, an actuator piston positioned in said first chamber, a release system assembly disposed in said second chamber, a release piston positioned in the release system assembly and adapted for cooperation with said wall to provide a pressure seal therebetween about said orifice, means for exerting a set force urging said release piston toward the wall to effect said pressure seal, means for establishing an actuating pressure in said second chamber to act upon a portion of the release piston outside said pressure seal to oppose said set force, and means for applying a triggering force to the release piston for cooperating with said actuating pressure in overbalancing the set force to expose an increased area of the release piston to the actuating pressure, whereby the release piston is accelerated from the wall to release the actuating pressure through the orifice upon said actuator piston.

8. An actuator comprising housing means, a wall defining an orifice between first and second pressure chambers within the housing means, an actuator piston positioned in said first pressure chamber, a release system assembly disposed in said second pressure chamber, a release piston positioned in the release system assembly, sealing means positioned between the release piston and the wall for effecting a pressure seal therebetween about said orifice, means for exerting a set force urging said release piston toward the wall to effect said pressure seal, and means for establishing an actuating pressure in said second chamber to act upon a portion of the release piston outside said pressure seal to overbalance said set force to eliminate the pressure seal and release the actuating pressure upon an increased area of the release piston, whereby the release piston is accelerated from the wall to release the actuating pressure through the orifice upon said actuator piston.

9. An actuator comprising housing means, a wall defining an orifice between first and second pressure chambers within the housing means, an actuator piston positioned in said first pressure chamber, a release system assembly disposed in said second pressure chamber, a release piston positioned in the release system assembly, a resilient sealing element for providing a pressure seal between the release piston and the wall about said orifice, means for exerting a set force urging said release piston toward the wall to effect said pressure seal, means for establishing an actuating pressure in said second chamber to act upon a portion of the release piston outside said pressure seal to oppose said set force, and means for applying a triggering force to the release piston for cooperating with said actuating pressure in overbalancing the set force to expose an increased area of the release piston to the actuating pressure, whereby the release piston is accelerated from the wall to release the actuating pressure through the orifice upon said actuator piston.

10. An actuator comprising housing means, a wall defining an orifice within the housing means, an actuator piston positioned on a first side of the wall, a release assembly disposed on a second side of the wall, a release piston positioned in the release assembly and adapted for cooperation with said wall to provide a pressure seal therebetween about said orifice, means for exerting a set force urging the release piston toward the wall to effect said pressure seal, and means for applying pressure to the release piston to overbalance the set force to eliminate the pressure seal and expose an increased area of the release piston to the pressure, thereby rapidly moving the release piston from the wall to release the pressure through the orifice to accelerate said actuator piston, means defining an aperture within the release assembly, means carried by the release piston for regulating flow through said aperture to decelerate the release piston, and an output thrust column attached to the actuator piston and extending outside said housing means.

11. An actuator comprising housing means, a wall defining an orifice within the housing means, an actuator piston positioned on a first side of the wall, a release system assembly positioned on a second side of the wall, a release piston slidable in the release assembly and adapted for cooperation with said wall to provide a pressure seal therebetween about said orifice, means for establishing a set pressure in said releasing system assembly for exerting a set force to urge the release piston toward the wall to effect said pressure seal, means for establishing pressure to act upon the release piston to overbalance the set force to eliminate said pressure seal and expose an increased area of the release piston to the actuating pressure, thereby rapidly moving the release piston from said wall to release the actuating pressure through the orifice to accelerate said actuator piston, and reseating means actuable within said release system assembly for urging the release piston against the wall to reestablish said pressure seal.

12. An actuator comprising housing means, a wall defining an orifice within the housing means, an actuator piston positioned on a first side of the wall, a release system assembly positioned on a second side of the wall, a release piston slidable in the release assembly, a resilient sealing element for effecting a pressure seal between the release piston and the wall about said orifice, means for establishing a set pressure in said release assembly for exerting a set force to urge the release piston toward the wall to effect said pressure seal, means for establishing an actuating pressure to act upon the release piston to overbalance the set force to eliminate said pressure seal and expose an increased area of the release piston to the actuating pressure, thereby rapidly moving the release piston from said wall to release the actuating pressure through the orifice upon said actuator piston, and reseating means actuable within said release assembly for urging the release piston against the wall to reestablish said pressure seal.

13. An actuator comprising a cylindrical housing, a wall defining an orifice between first and second pressure chambers within the housing, an actuator piston positioned in said first chamber, a release system assembly attached to said wall and disposed in said second pressure chamber, a release piston positioned within said release system assembly and confronting the wall, said release piston and the wall being adapted for cooperation to provide a pressure seal therebetween about said orifice, means for establishing a set pressure in the release system assembly for exerting a set force urging the release piston against the wall to establish said pressure seal, means for establishing an actuating pressure in said second chamber to act upon a portion of the release piston outside said pressure seal to overbalance the set force and expose an increased area of the release piston to the actuating pressure, thereby accelerating the release piston from the wall to release the actuating pressure through the orifice upon said actuator piston, and a contoured metering member carried by the actuator piston for regulating flow through the orifice to produce a predetermined thrust-time output pattern on the actuator piston.

14. An actuator comprising a cylindrical housing, a wall defining an orifice within the housing, a release system assembly attached to said wall and disposed on a first side thereof, a release piston positioned within said release system assembly, a resilient sealing element positioned between the release piston and the wall for effecting a pressure seal therebetween about said orifice, means for establishing a set pressure in the release system assembly for exerting a set force urging the release piston against the wall to establish said pressure seal, means for establishing an actuating pressure in said first chamber to act upon a portion of the release piston outside said pressure seal to overbalance the set force and expose an increased area of the release piston to the actuating pressure, thereby accelerating the release piston from said wall to release the actuating pressure through the orifice.

15. An actuator comprising a cylindrical housing, a wall defining an orifice between first and second pressure chambers within the housing, an actuator piston positioned in said first chamber, a release system assembly attached to said wall and disposed in said second pressure chamber, a release piston positioned within said release system assembly and confronting the wall, a resilient sealing element positioned between the release piston and the wall for effecting a pressure seal therebetween about said orifice, means for establishing a set pressure in the release system assembly for exerting a set force urging the release piston against the wall to establish said pressure seal, and means for establishing an actuating pressure in said second chamber to act upon a portion of the release piston outside said pressure seal to overbalance the set force and expose an increased area of the release piston to the actuating pressure, thereby accelerating the release piston from said wall to release the actuating pressure through the orifice to accelerate the actuator piston.

16. An actuator comprising housing means, a wall defining an orifice within the housing means, an actuator piston positioned on a first side of the wall, a release system assembly disposed on a second side of the wall, a release piston slidable in the release system assembly and adapted for cooperation with the wall to provide a pressure seal therebetween about said orifice, means for establishing a set pressure in said release system assembly for exerting a set force to urge the release piston toward the wall to effect said pressure seal, means for establishing an actuating pressure to act upon a portion of the release piston outside the pressure seal to overbalance the set force to eliminate said pressure seal and expose an increased area of the release piston to the actuating pressure, thereby rapidly moving the release piston from the wall to release the actuating pressure through said orifice upon said actuator piston, a contoured metering member on said actuator piston for movement within the orifice for regulating release of the actuating pressure upon the actuator piston to produce a predetermined thrust-time pattern thereon, means defining a restricted aperture within said release system assembly, and a contoured deceleration pin on said release piston for movement relative to said apertured wall member to regulate flow therethrough to develop predetermined deceleration of the piston.

17. An actuator comprising housing means, a wall defining an orifice within the housing means, an actuator piston positioned on a first side of the wall, a release system assembly disposed on a second side of the wall, a release piston slidable in the release assembly and adapted for cooperation with said wall to provide a pressure seal therebetween about said orifice, means for establishing a set pressure in said release assembly for exerting a set force to urge the release piston toward the wall to effect said pressure seal, means for establishing an acutating pressure to act upon a release piston area outside the pressure seal to overbalance the set force to eliminate said pressure seal and expose an increased area of the release piston to the actuating pressure, thereby rapidly moving the release piston from the wall to release the actuating pressure through the orifice upon said actuator piston, an apertured wall member slidably positioned in said release system assembly, a contoured deceleration pin on said release piston for movement relative to said apertured wall member to regulate flow therethrough to develop predetermined deceleration of the release piston, means cooperating with said apertured wall member to provide a movable reseating assembly in the release system assembly, and means for establishing a reseating pressure in the release system assembly to move the reseating assembly against the actuating pressure to reseat the release piston against said wall.

18. An actuator comprising a cylindrical housing, a wall defining an orifice between first and second pressure chambers within the housing, an actuator piston positioned in said first chamber and confronting said wall, a release system assembly attached to said wall and disposed in said second chamber, a release piston positioned in said release system assembly, a resilient sealing element for providing a pressure seal between the release piston and the wall about said orifice, means for establishing a set pressure in the release system assembly for exerting a set force urging the release piston against the wall to establish said pressure seal, means for establishing an actuating pressure in said second chamber to act upon a portion of the release piston outside said pressure seal to overbalance the set force and expose an increased area of the release piston to the actuating pressure, thereby accelerating the release piston from the wall to release the actuating pressure through the orifice to accelerate said actuator piston, means for decelerating the release piston, and an output thrust column attached to the actuator piston.

19. An actuator comprising a cylindrical housing, a wall having an orifice and separating first and second pressure chambers within the housing, an actuator piston positioned in said first chamber and confronting said wall, a release system assembly attached to the wall and disposed in said second chamber, a release piston positioned in said release system assembly, a resilient sealing element positioned between the release piston and the wall for effecting a pressure seal therebetween about said orifice, means for establishing a set pressure in the release system assembly for exerting a set force urging the release piston against the wall to establish said pressure seal, means for establishing an actuating pressure in said second chamber to act upon a portion of the release piston outside said pressure seal to overbalance the set force and expose an increased area of the release piston to the actuating pressure, and means actuable within the release system assembly for urging the release piston toward said orifice wall against the actuating pressure to re-establish said pressure seal.

References Cited in the file of this patent

UNITED STATES PATENTS 2,825,306    Buri _____ Mar. 4, 1958

FOREIGN PATENTS 631,332    Great Britain _____ Nov. 1, 1949